(12) United States Patent
Hori et al.

(10) Patent No.: US 8,473,116 B2
(45) Date of Patent: Jun. 25, 2013

(54) TRAVELING VEHICLE SYSTEM AND COMMUNICATION METHOD IN THE TRAVELING VEHICLE SYSTEM

(75) Inventors: Kikuo Hori, Kyoto (JP); Toru Ogawa, Kyoto (JP); Hitomi Hirayama, Kyoto (JP); Masayuki Yamana, Kyoto (JP)

(73) Assignee: Murata Machinery, Ltd., Kyoto (JP)

(*) Notice: Subject to any disclaimer, the term of this patent is extended or adjusted under 35 U.S.C. 154(b) by 194 days.

(21) Appl. No.: 13/022,830

(22) Filed: Feb. 8, 2011

(65) Prior Publication Data

US 2011/0202202 A1    Aug. 18, 2011

(30) Foreign Application Priority Data

Feb. 15, 2010 (JP) ................. 2010-030164

(51) Int. Cl.
  *G05D 1/00* (2006.01)
  *G05D 3/00* (2006.01)
  *G06F 7/00* (2006.01)
  *G06F 17/00* (2006.01)

(52) U.S. Cl.
  USPC ........................................... 701/2

(58) Field of Classification Search
  USPC .................. 700/213, 452; 701/2; 246/182 R
  See application file for complete search history.

(56) References Cited

U.S. PATENT DOCUMENTS

| 6,135,396 | A  | * | 10/2000 | Whitfield et al. | 246/182 R |
| 8,036,771 | B2 | * | 10/2011 | Hayashi | 700/213 |
| 8,135,496 | B2 | * | 3/2012 | Hayashi | 700/229 |
| 2008/0147306 | A1 |   | 6/2008 | Hayashi | |
| 2009/0259349 | A1 | * | 10/2009 | Golenski | 701/2 |
| 2010/0106294 | A1 | * | 4/2010 | Sugihara et al. | 700/245 |
| 2011/0202202 | A1 | * | 8/2011 | Hori et al. | 701/2 |

FOREIGN PATENT DOCUMENTS

| JP | 2008079128 | * | 2/1994 |
| JP | 08-079128 | A | 3/1996 |
| JP | 2005223511 | * | 1/2005 |
| JP | 2007-041735 | A | 2/2007 |
| JP | 2008150135 | * | 3/2008 |
| JP | 2008-150135 | A | 7/2008 |

OTHER PUBLICATIONS

Official Communication issued in corresponding Japanese Patent Application No. 2010-030164, mailed on May 23, 2012.
Official Communication issued in corresponding Japanese Patent Application No. 2010-030164, mailed on Dec. 12, 2011.

* cited by examiner

*Primary Examiner* — Thomas Black
*Assistant Examiner* — Robert Payne
(74) *Attorney, Agent, or Firm* — Keating & Bennett, LLP (57) ABSTRACT

A system server and access points are connected through a LAN preferably on the ground. A control cycle is divided into an instruction time zone to provide instructions from the access points to traveling vehicles, and a report time zone to provide reports from the traveling vehicles to the access points. The access points transmit target positions in the instruction time zone, and the traveling vehicles report positions in the report time zone. The system server determines target positions based on the reported positions.

9 Claims, 13 Drawing Sheets

Initial value of time data :
Invalid

TRAVELING VEHICLE SYSTEM AND COMMUNICATION METHOD IN THE TRAVELING VEHICLE SYSTEM

BACKGROUND OF THE INVENTION

1. Field of the Invention

The present invention relates to a traveling vehicle system. In particular, the present invention relates to a system in which a large number of traveling vehicles are controlled by a system server through a wireless LAN.

2. Description of the Related Art

The applicant proposed a system in which a large number of traveling vehicles such as overhead traveling vehicles are controlled by a system server on the ground. See, for example, JP2008-150135A. In this system, the system server provides an instruction of a target position or the like for each traveling vehicle in each control cycle of, e.g., 0.1 s, for allowing the traveling vehicle to execute the instruction. A wireless LAN is used suitably for communication between the traveling vehicles and the system server. In this system, although the wireless LAN is used, it is important to ensure that the instructions from the system server to the traveling vehicles do not have any delay, and reports from the traveling vehicles to the system server do not have any delay. If the instructions or the reports are delayed, the system server cannot control the traveling vehicles in real time. Therefore, for example, the traveling vehicles need to travel at lower velocity.

SUMMARY OF THE INVENTION

Preferred embodiments of the present invention carry out communication between a system server and traveling vehicles efficiently, prevent relative positions between traveling vehicles from being affected by delays in communication, and allow traveling vehicles to report to access points efficiently.

A traveling vehicle system according to a preferred embodiment of the present invention includes a system server, a plurality of access points connected to the system server through a LAN, and a plurality of traveling vehicles arranged to communicate with the access points in each control cycle through wireless communication. The control cycle includes an instruction time zone to provide instructions from the access points to the traveling vehicles, and a report time zone to provide reports from the traveling vehicles to the access points. The access point includes an instructing unit arranged to transmit a target position to the traveling vehicle in the instruction time zone. The traveling vehicle includes a reporting unit arranged to report a position to the access point in the report time zone. The system server includes an instruction generator arranged to determine the target position of the traveling vehicle based on the position reported to the access point. The system server is configured to transmit the determined target position to the access point.

In a preferred embodiment of the present invention, the instruction time zone and the report time zone are preferably provided in each control cycle. In the instruction time zone, the traveling vehicle only transmits a confirmation signal or the like, without performing any communication that may interfere with the instruction from the access point. Therefore, the access point can provide a position instruction for the traveling vehicle in the instruction time zone efficiently. Further, the traveling vehicle reports a position in the report time zone. Based on the reported position, the system server can generate the next target position. In this manner, the system server can control the traveling vehicle through the wireless LAN.

Preferably, each of the system server and the traveling vehicle includes a clock. The time data of the clock of the system server is transmitted from the access point to the traveling vehicle together with the target position, and the clock of the traveling vehicle is calibrated for synchronization with the transmitted time data. In this manner, by synchronizing the clock of the traveling vehicle with the clock of the system server, the entire system can be operated using a common clock.

In particular, preferably, a plurality of the traveling vehicles generate reports at a common time, and execute instructions at the common time, i.e., simultaneously. In this manner, the system server can recognize relative positions between the traveling vehicles without being affected by delays in data transmission or the like. Further, even if there is any delay in reception or the like, the relative positions between the traveling vehicles can be maintained.

In particular, preferably, the report time zone is divided into a plurality of time slots, and the traveling vehicle includes a selector arranged to randomly select one of the plurality of time slots to transmit the report to the access point in the selected time slot. Preferably, in the report time zone, interference between reports from the traveling vehicles, i.e., collision between reporting packets should be prevented. For this purpose, for example, the order of reports may be designated in the instructions. However, in this case, the load on the access point is increased. Therefore, the report time zone is preferably divided into a plurality of time slots, and each of the traveling vehicles randomly selects one of the time slots. In this manner, the order of reports can be determined autonomously. Moreover, by increasing the number of time slots, the probability of collision between reports becomes small. Since the time slot is selected randomly, the traveling vehicles can be treated fairly.

According to a preferred embodiment of the present invention, the following steps are performed: connecting the system server and a plurality of access points through a LAN; transmitting target positions from the access points to the plurality of the traveling vehicles in an instruction time zone within the control cycle; reporting positions from the traveling vehicles to the access points in a report time zone within the control cycle; determining the target positions of the traveling vehicles by the system server based on the positions reported to the access point; and transmitting the target positions to the access points between the report time zone and the instruction time zone by the system server.

In this specification, the description regarding the traveling vehicle system is directly applicable to the communication method in the traveling vehicle system, and description regarding the communication method in the traveling vehicle system is directly applicable to description regarding the traveling vehicle system.

The above and other elements, features, steps, characteristics and advantages of the present invention will become more apparent from the following detailed description of the preferred embodiments with reference to the attached drawings.

DETAILED DESCRIPTION OF THE PREFERRED EMBODIMENTS

Hereinafter, preferred embodiments of the present invention will be described.

Figure 1:
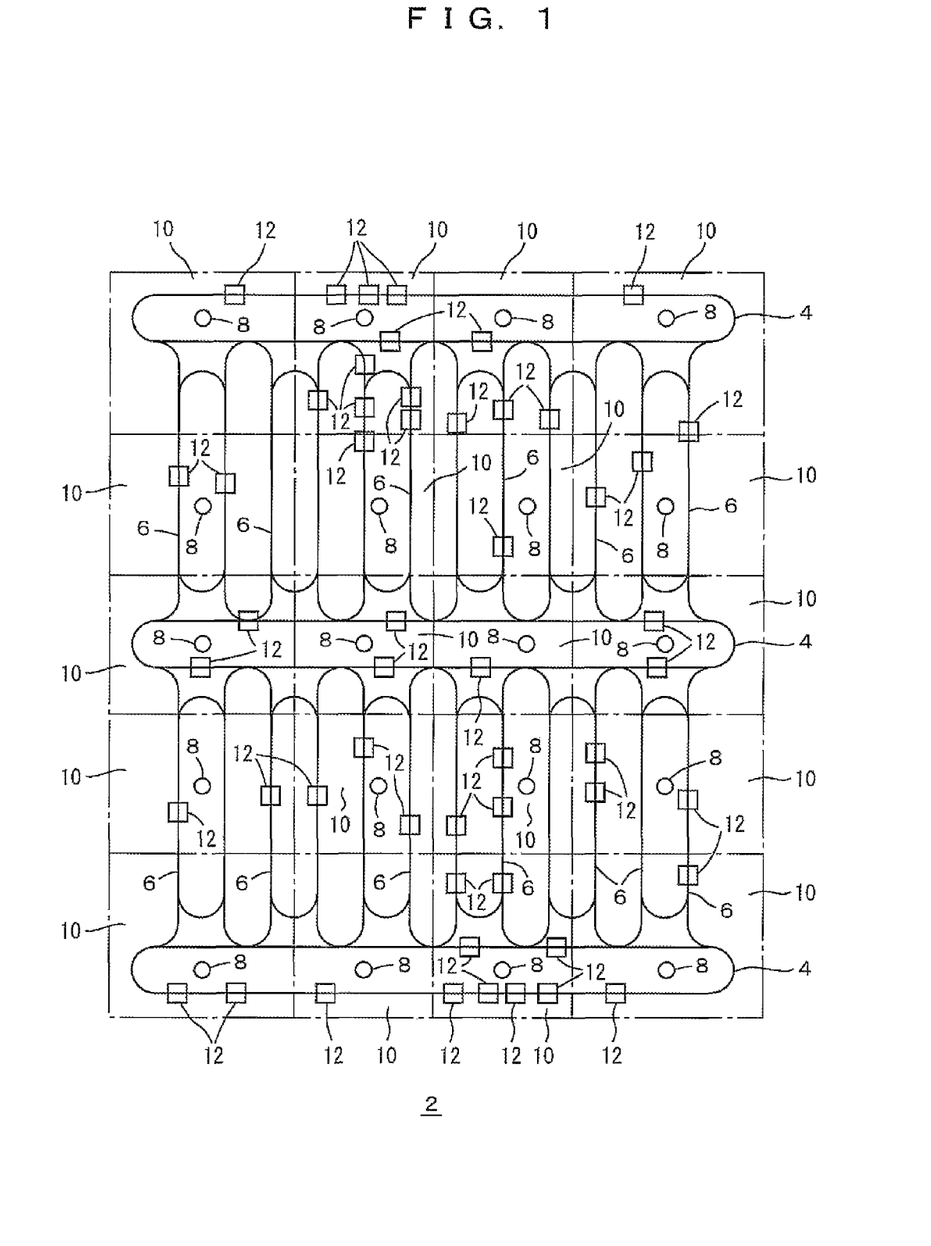
FIG. 1 is a plan view showing a layout in a traveling vehicle system according to a preferred embodiment of the present invention.

FIGS. 1 to 14 show a traveling vehicle system 2 according to a preferred embodiment of the present invention. FIG. 1 shows a layout of the system 2. Reference numerals 4 denote inter-bay routes each connecting a plurality of intra-bay routes 6. The entire routes 4, 6 are divided into about 10 to 50 portions of areas 10. An access point 8 is provided in each of the areas 10. The areas 10 are narrower in comparison with the communication capability of the access point 8. Specifically, the areas 10 are arranged such that each of traveling vehicles 12 can communicate with at least two access points 8 in any point on the travel routes 4, 6. In segments deviated from the normal travel route for transportation of articles, such as retraction segments and maintenance segments, the areas 10 may be arranged such that the traveling vehicle 12 can only communicate with one access point 8.

Reference numerals 12 denote the traveling vehicles. In the present preferred embodiment, overhead traveling vehicles are preferably used as traveling vehicles 12, for example. Alternatively, rail guided vehicles that travel on the ground or automated guided vehicles that travel without any rail may be used. A reference numeral 14 denotes a ground LAN arranged to connect the access points 8, a motion controller 16, and a system server 18. The system server 18 is connected to a host server 20 through another LAN or the ground LAN 14. The host server 20 sends requests such as transportation requests to the system server 18. The system server 18 stores data such as positions, diverging directions, and velocities of a plurality of the traveling vehicles 12. The system server 18 at least stores the positions of the traveling vehicles 12. For example, the system server 18 transmits instructions to the traveling vehicles 12 in every control cycle of, e.g., 0.1 s, more generally, 0.01 s to 0.3 s through the motion controller 16 and the access points 8. For example, each of the instructions includes data of a target position, a diverging direction, if diverging will be done, and a transfer instruction, if transfer of articles between load ports, etc., will be necessary. Additionally, the instruction may include data of a target velocity of the traveling vehicle 12.

Figure 2:
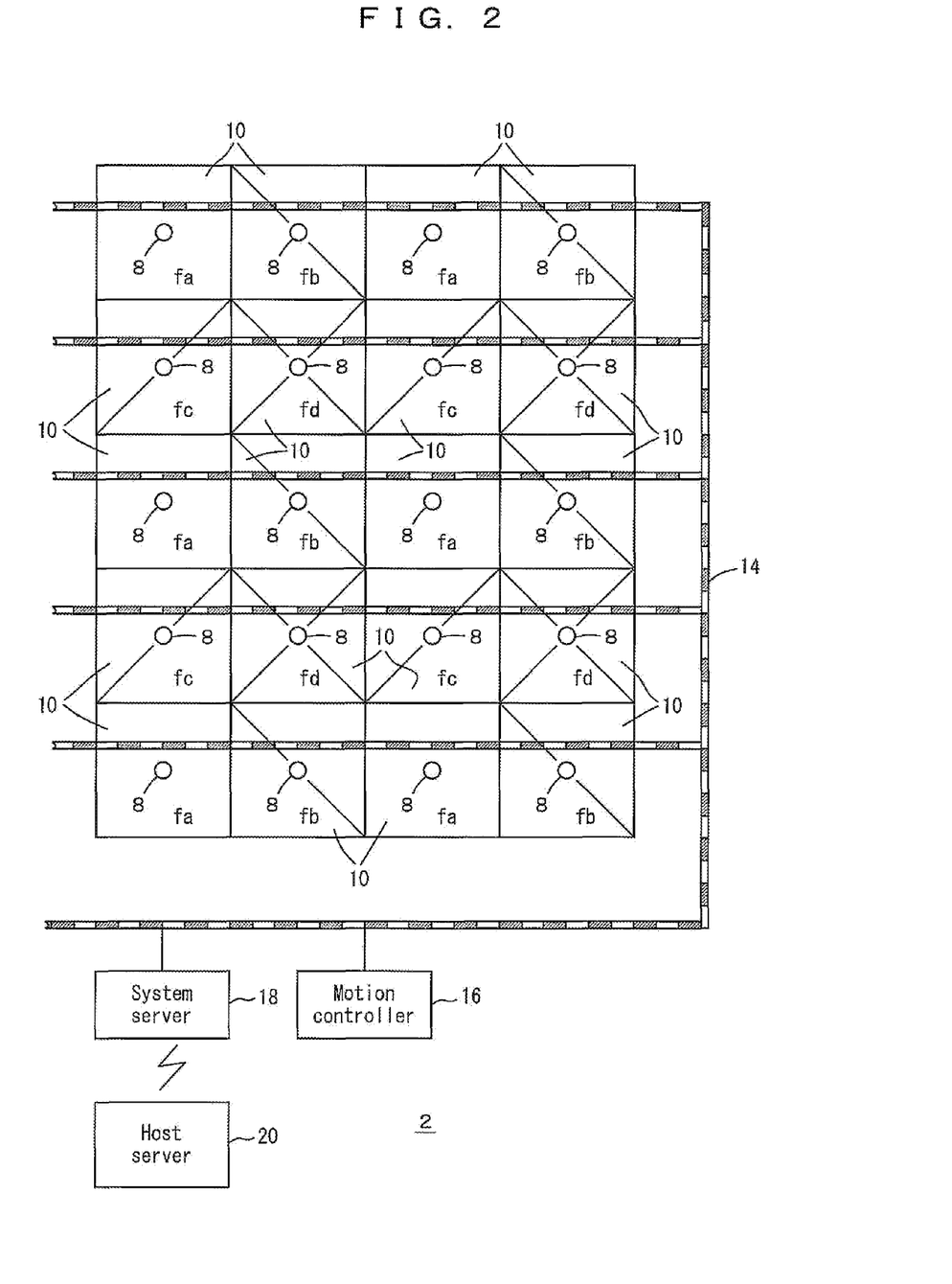
FIG. 2 is a plan view showing positions of access points and a communication channel according to a preferred embodiment of the present invention.

FIG. 2 is a diagram showing a layout of the areas 10 and the access points 8 in the traveling vehicle system 2. As described above, at any point on the travel route, the traveling vehicle can communicate with a plurality of the access points 8. However, only on the normal travel route as a segment to transport the articles, the traveling vehicle may communicate with a plurality of the access points 8. In this layout of the present preferred embodiment, even if one of the access points 8 is broken down, the traveling vehicle can travel without any interruption. In the present preferred embodiment, for example, one side or the diameter of the area 10 is preferably about 30 m, and for example, the maximum number of traveling vehicles 12 preferably is about 500. The number of access points 8 is preferably about 20, for example. The maximum number of the traveling vehicles 12 per access point 8 preferably is about 60, for example. In the illustrated present preferred embodiment, although one motion controller 16 is preferably provided for the entire traveling vehicle system 2, in the case where the system has a large scale, a plurality of motion controllers 16 may be provided.

Each area has a different communication channel with the traveling vehicle, i.e., a different frequency band for communication with the traveling vehicle. For example, four channels fa to fd are preferably provided in the system. In this manner, the areas 10 can be provided such that channels for the adjacent areas are always different. The border between the areas 10 and the channels in the respective areas are written in the map stored by the traveling vehicle. The traveling vehicle travels while confirming the current position by a suitable sensor such as an absolute position sensor, for example. Therefore, the traveling vehicle can know in which area 10 the traveling vehicle is traveling, and the type of channel to be used. The traveling vehicle can determine that the traveling vehicle is approaching the border between areas and the channel of the next area from the map.

Figure 3:
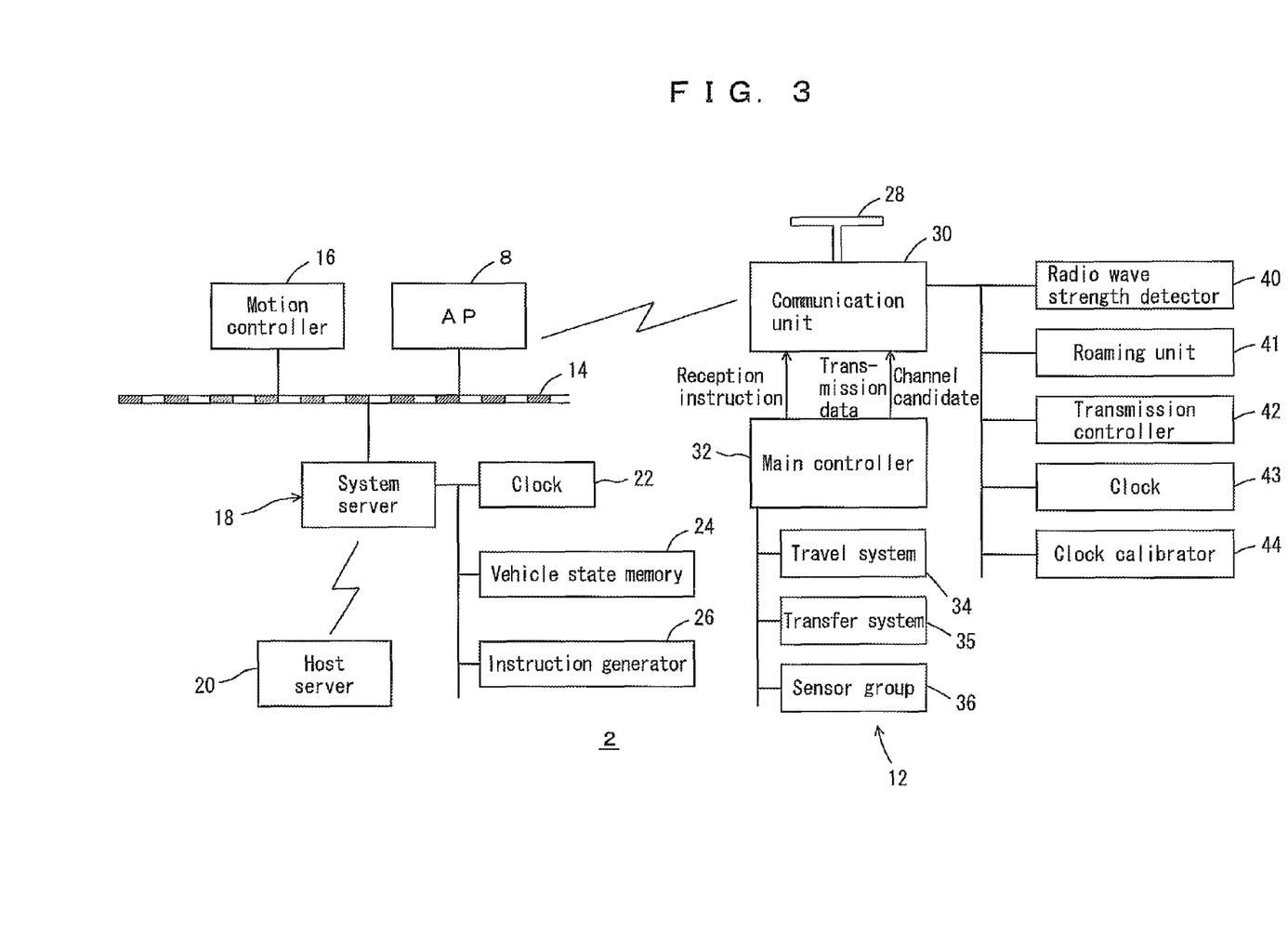
FIG. 3 is a block diagram showing the relationship between a traveling vehicle, the access point, a motion controller, and a system server.

FIG. 3 shows the structures of components from the traveling vehicle 12 to the host server 20. The system server 18 includes a clock 22. The clock 22 is preferably used as a base clock used commonly in the traveling vehicle system. A vehicle state memory 24 stores data of each traveling vehicle 12, such as a current position, a velocity, a diverging direction if any, and transfer of articles if any, and instructions already assigned to the traveling vehicle 12. An instruction generator 26 generates instructions for each traveling vehicle 12, regarding data such as a target position, a diverging direction, transfer of articles at the end of the next control cycle. The memory 24 and the generator 26 are functional units, and may not have dedicated hardware.

Each of the access points 8 communicates through an instruction unit with traveling vehicles 12 in its communication range. Communication is performed in the unit of a control cycle of 100 ms. The access point 8 outputs a beacon signal, e.g., at the beginning of the control cycle to notify the channel or the like used by the access point 8 to the traveling vehicles 12. In a period of about 30 ms, for example, at the beginning of the control cycle, instructions are transmitted from the access point 8 to the traveling vehicles 12. In the next period of about 40 ms, for example, reports or the like from the traveling vehicles 12 are received. The last period of about 30 ms, for example, is reserved. For example, the motion controller 16 transmits instructions from the system server 18 to 20 access points 8, and transmits reports from the access points 8 collectively to the system server 18.

The traveling vehicle 12 communicates with the access point 8 through an antenna 28 and a communication unit 30 which works as a reporting unit to the access points 8, and transfers the instructions to a main controller 32. The traveling vehicle 12 receives reports from the main controller 32, and transmits the reports (transmission data) to the system server 18. Further, the main controller 32 stores a map of the travel route. When the traveling vehicle approaches a border with a new area, the main controller 32 instructs the communication unit 30 to detect the beacon signal from the access point 8 in the next area, and inputs the channel used for beacon detection to the communication unit 30.

The main controller 32 controls a travel system 34, a transfer system 35, and a group of sensors (sensor group) 36. The main controller 32 preferably includes components such as a microcomputer, a programmable controller or the like. In the travel system 34, servo control of an unshown travel motor is implemented for allowing the traveling vehicle to travel in accordance with the target position received from the system server 18. In the case where the traveling vehicle diverges from a diverging section, the traveling vehicle travels in the diverging direction designated by the system server 18. The transfer system 35 includes, e.g., an elevation motor arranged to elevate an elevation frame, a lateral feeding motor arranged to laterally feed the elevation frame or the like, and a rotation motor arranged to rotate these components about a vertical axis to align the orientation of articles. The main controller 32 drives the transfer system 35 in accordance with the transfer instruction received from the system server 18. The sensor group 36 includes an absolute sensor arranged to detect an absolute position of the traveling vehicle, a distance sensor arranged to detect a leading traveling vehicle, an article sensor arranged to detect the presence of any articles that have already been stored in a buffer, a load port, or the like, and an RFID reader arranged to read RFIDs attached to the articles or the like. The main controller 32 detects surrounding conditions by the sensor group 36, and transmits these items of data to the system server 18 as necessary.

The communication unit 30 includes a radio wave strength detector 40 arranged to detect the strength of radio waves from the access point 8. A roaming unit 41 controls roaming to a new access point 8. A transmission controller 42 controls data transmission to the access point 8, and includes a random number generator arranged to generate a random number (e.g., in 40 levels of 0 to 39, and preferably, in 8 levels to 64 levels) as the time assigned to itself for data transmission, and generates a random number (e.g., in 16 levels of 0 to 15) as a back-off period. The random number generator works as a selector to select one of the time slots. A clock 43 of the vehicle 12 is synchronized with the clock 22 of the system server 18, and the time of the clock 43 is counted, e.g., in the unit of 1 ms, by an unshown clock signal. A clock calibrator 44 calibrates time data of the clock 43 in accordance with a time stamp from the system server 18. The communication unit 30 and its components such as the detector 40 and the calibrator 44 preferably include a dedicated microcomputer, a programmable computer or the like, and may be present in the same computer together with the main controller 32.

Figure 4:
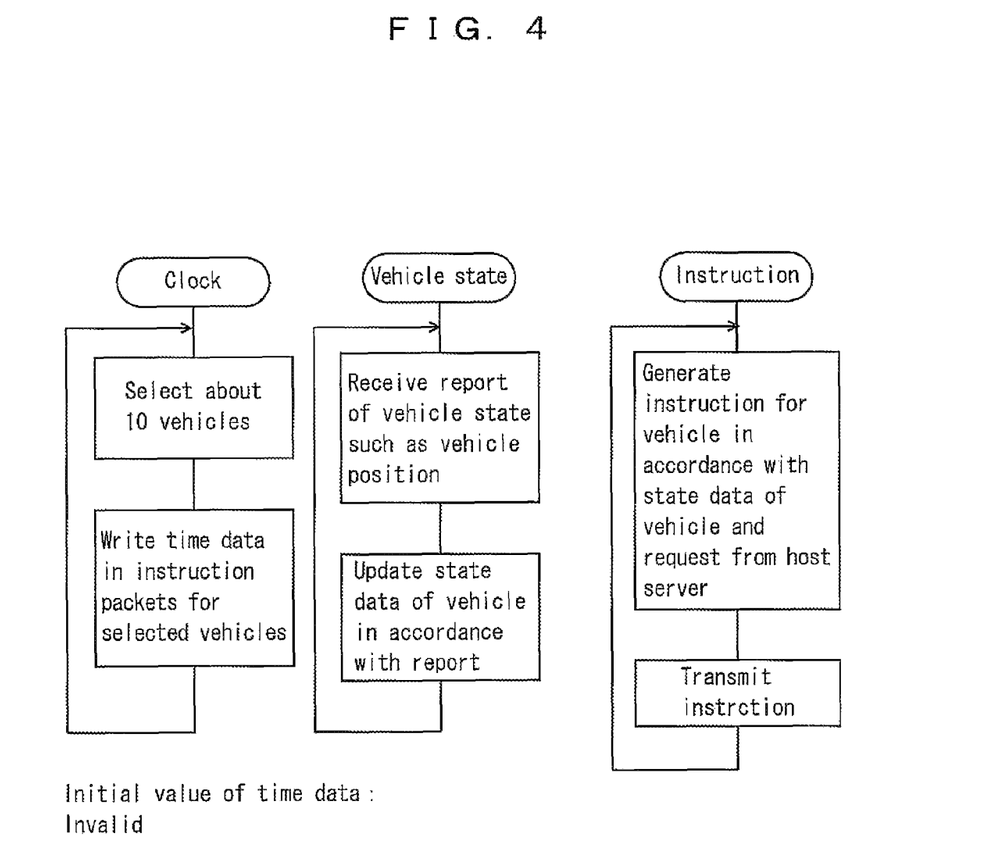
FIG. 4 is a flow chart showing processing in the system server.

FIG. 4 shows processing in the system server 18. For synchronizing clocks in the entire system, a time stamp is generated by the system server 18. It is assumed that the time stamp is transmitted to the traveling vehicle together with an instruction in the first 30 ms of the control cycle, for example. In this case, even if the time required for transmission to the system server to the access point is disregarded, an error up to 30 ms occurs from generation of the time stamp to transmission of the time stamp to the traveling vehicle. For this reason, it is difficult to transmit the time stamp having significance to each of several hundreds of traveling vehicles in each control cycle. Therefore, the system server selects about 10, e.g., 5 to 50 traveling vehicles from about 500 traveling vehicles at the maximum in each control cycle, and calibrates the time of only the selected traveling vehicles in each control cycle. Assuming that the control cycle is 0.1 s, for example, and the number of the traveling vehicles is 500, for example, by selecting ten traveling vehicles in each control cycle, for example, a correct time stamp can be transmitted to the traveling vehicles in each cycle of approximately 5 s, for example. Specifically, the time data (time stamp) is written in the instruction packets transmitted to the selected traveling vehicles. The time data for the other traveling vehicles is invalidated. The order of packet transmissions in the motion controller is determined so that the packets containing instructions to the selected traveling vehicles can be sent at the beginning of the control cycle.

The system server stores data regarding states of the traveling vehicles under control, and receives state reports of the traveling vehicles such as positions of the traveling vehicles in each control cycle. Then, the system server updates the state data of the traveling vehicles. If the system server failed to receive the state data of any of the vehicles, the system server does not update the state data of the vehicle. In the process of providing instructions to the vehicles, in accordance with the state data of the vehicles and transportation requests from the host server, the system server generates the instructions to the vehicles. The generated instructions are transmitted to the traveling vehicles in each control cycle through the motion controller and the access points.

Figure 5:
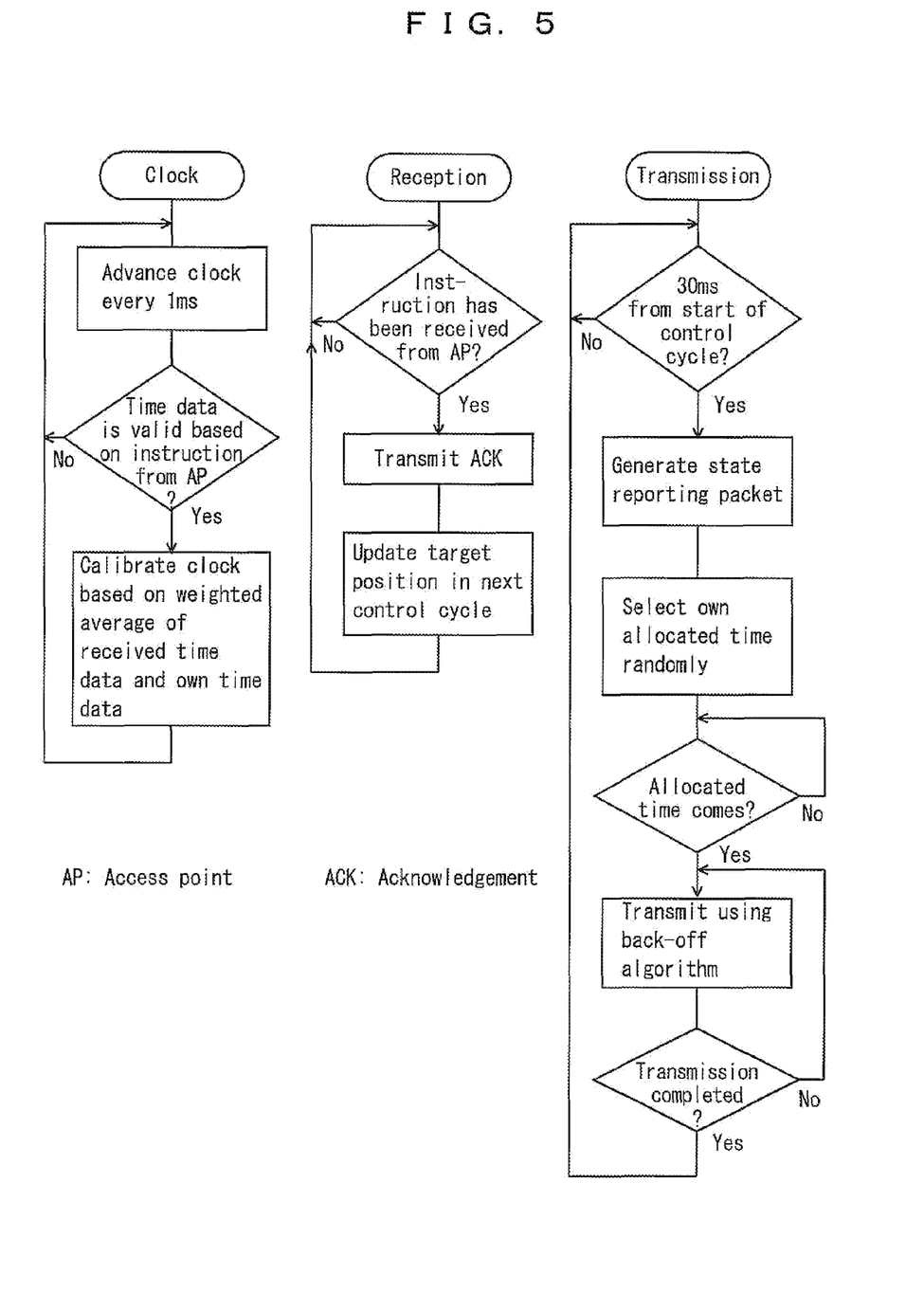
FIG. 5 is a flow chart showing processing in the traveling vehicle.
Figure 6:
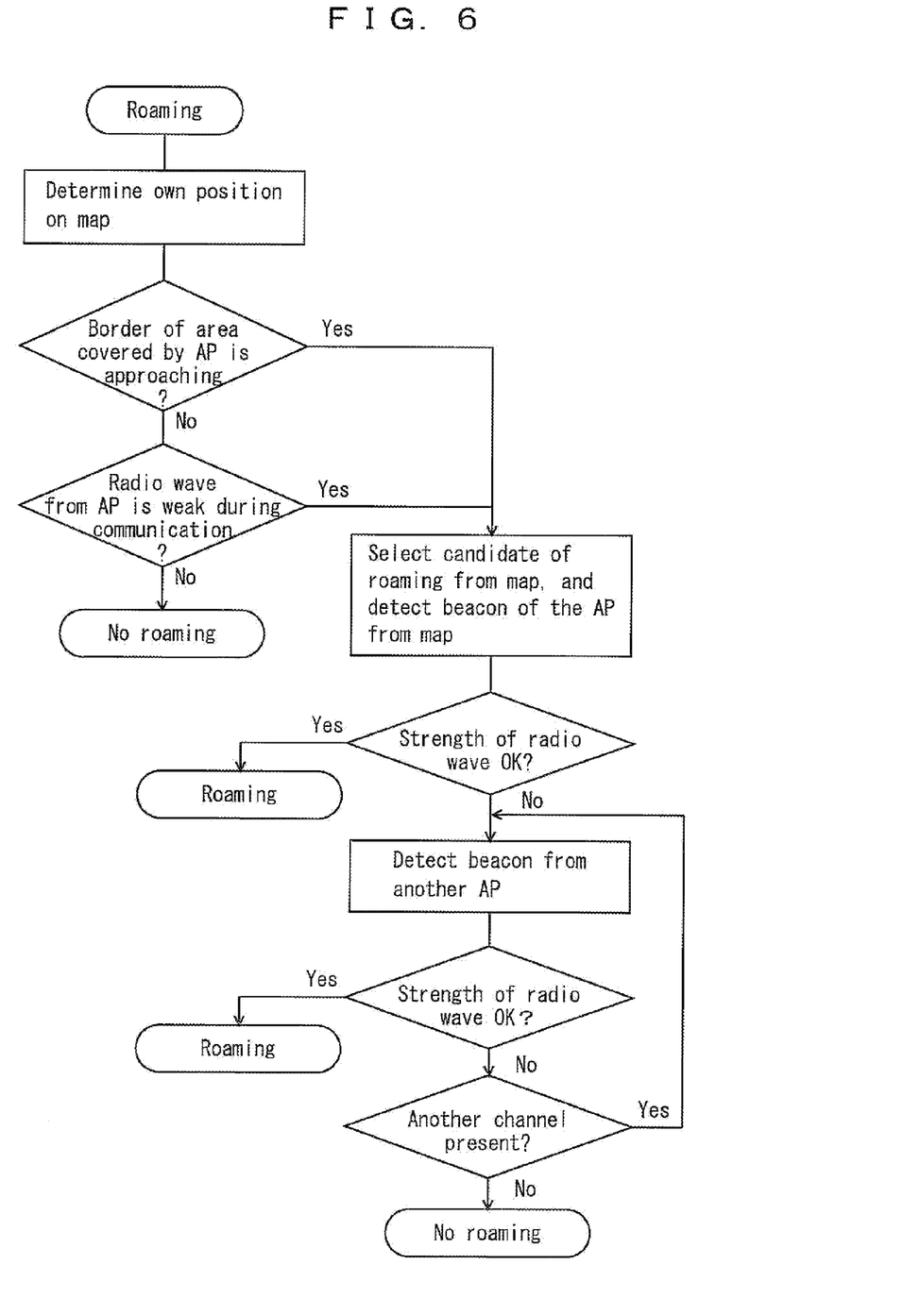
FIG. 6 is a flow chart showing processing related to roaming in the traveling vehicle.

FIGS. 5 and 6 show processing in the traveling vehicle. In the clock process, the traveling vehicle uses its own clock to advance the time in each cycle of 1 ms, for example. In the case where any time stamp is added an instruction from the access point, the clock is calibrated using the weighted average of the time data of time stamp and the time of its own clock. The ratios between the weight of own clock and the clock of the time stamp is, e.g., 1:1 to 5:1. In this manner, assuming that the time stamp is received in every interval of 5 s, for example, the clock of the traveling vehicle is calibrated with the period of about 10 s to about 40 s, for example. One time stamp calibrates the clock of the traveling vehicle only partially to minimize the influence of the delay in transmission of the time stamp from the access point to the traveling vehicle. Although timing of transmission of the transmission data by the access point in the control cycle changes each time, by rewriting the clock of the traveling vehicle gradually, the influence due to the delay in transmission from the access point is minimized.

In the instruction receiving process, when the traveling vehicle receives an instruction from the access point, the traveling vehicle returns a reception acknowledgement packet, and in accordance with the instruction, updates the target position in the next control cycle. The retrial of transmission of the instruction and the report is performed up to twice. In one control cycle, three transmissions including the first transmission are permitted. If the instruction is not received in all of the three transmissions, since there is no update in the target position or the like, the traveling vehicle is decelerated.

The transmission process from the traveling vehicle waits 30 ms from the beginning of the control cycle. At this time, a state reporting packet to be transmitted to the system server is generated. Since all of the traveling vehicles include clocks synchronized with the clock of the system server, at a time point when the same amount of time elapses from the start of the control cycle, the state reporting packets are generated concurrently. Assuming that approximately 40 ms, for example, is allocated for transmission to the access point, the traveling vehicle divides the period of approximately 40 ms into 40 periods. One period of about 1 ms, for example, is regarded as the time allocated to the traveling vehicle itself. The allocated time is selected by a random number. The traveling vehicle waits until the allocated time comes. When the allocated time comes, the traveling vehicle prevents collision of the packets by a back-off algorithm, and transmits the state reporting packet.

FIG. 6 shows a roaming process in the traveling vehicle. The traveling vehicle knows its position on the map, and knows channels of the next area. When the border between the areas approaches, or when the radio wave from the access point with which the traveling vehicle is currently communicating becomes weak, roaming is started. In roaming, a channel of the next area is determined from the map, and the beacon signal in the channel is tried to be detected. The beacon signal is transmitted, e.g., at the beginning of the control cycle. If the radio wave strength of the beacon signal is sufficient, roaming is performed. If the strength is not sufficient, roaming is tried in the remaining two channels. Since the channels used by the system are limited to four types, and which channel should be tried for roaming can be seen from the map, roaming can be performed easily.

At any point on the travel route, since communication can be performed in two channels, even if any trouble occurs at an access point, communication with the other access points can be maintained. For example, roaming can be completed by transmitting a probe request to the access point from the traveling vehicle in a time zone allocated for transmission to the access point, and receiving a probe permission from the access point. It should be noted that the probe request may be added to the state reporting packet for transmission. Further, instead of making a probe request, roaming may be completed by transmitting reports such as an ID of the traveling vehicle, a destination, an ID of a transportation instruction, the current position, a velocity, and a diverging direction from the traveling vehicle, and confirming that the access point has received reports from a new traveling vehicle.

Figure 7:
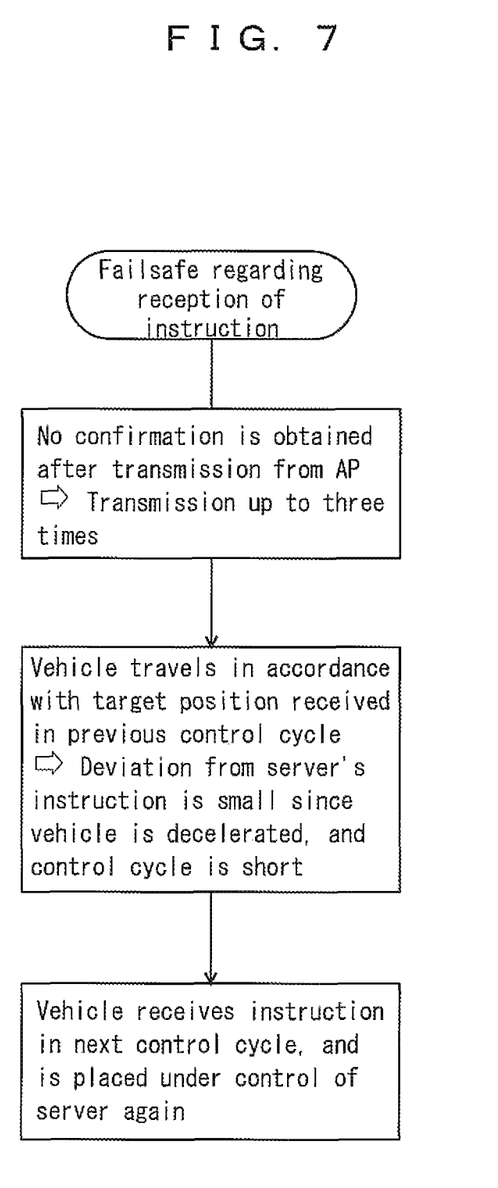
FIG. 7 is flow chart showing a failsafe mechanism in a case where the traveling vehicle failed to receive an instruction from the system server.

FIG. 7 shows a failsafe mechanism in the case where the traveling vehicle has failed to receive an instruction from the system server. In the case where no acknowledgement can be obtained from the traveling vehicle even if the access point has transmitted an instruction, the access point retries the transmission up to twice. Therefore, the probability that the traveling vehicle fails to receive the transmission is basically very small. Nevertheless, if the traveling vehicle failed to receive the instruction in the tree times of tries, the traveling vehicle travels in accordance with the target position in the previous control cycle. Therefore, in most cases, the traveling vehicle overruns, and is decelerated. Since the control cycle is about 0.1 s, for example, assuming that the maximum traveling velocity of the traveling vehicle is about 4 m/s, for example, the traveling vehicle overruns by a distance of about 40 cm at a maximum, for example. The system server provides an instruction of the target position by determining the inter-vehicle distance so that no interference between the traveling vehicles occur even in the presence of the overrun to this extent. In the next control cycle, if the traveling vehicle successfully receives the instruction, again, the traveling vehicle is placed under control of the server.

Figure 8:
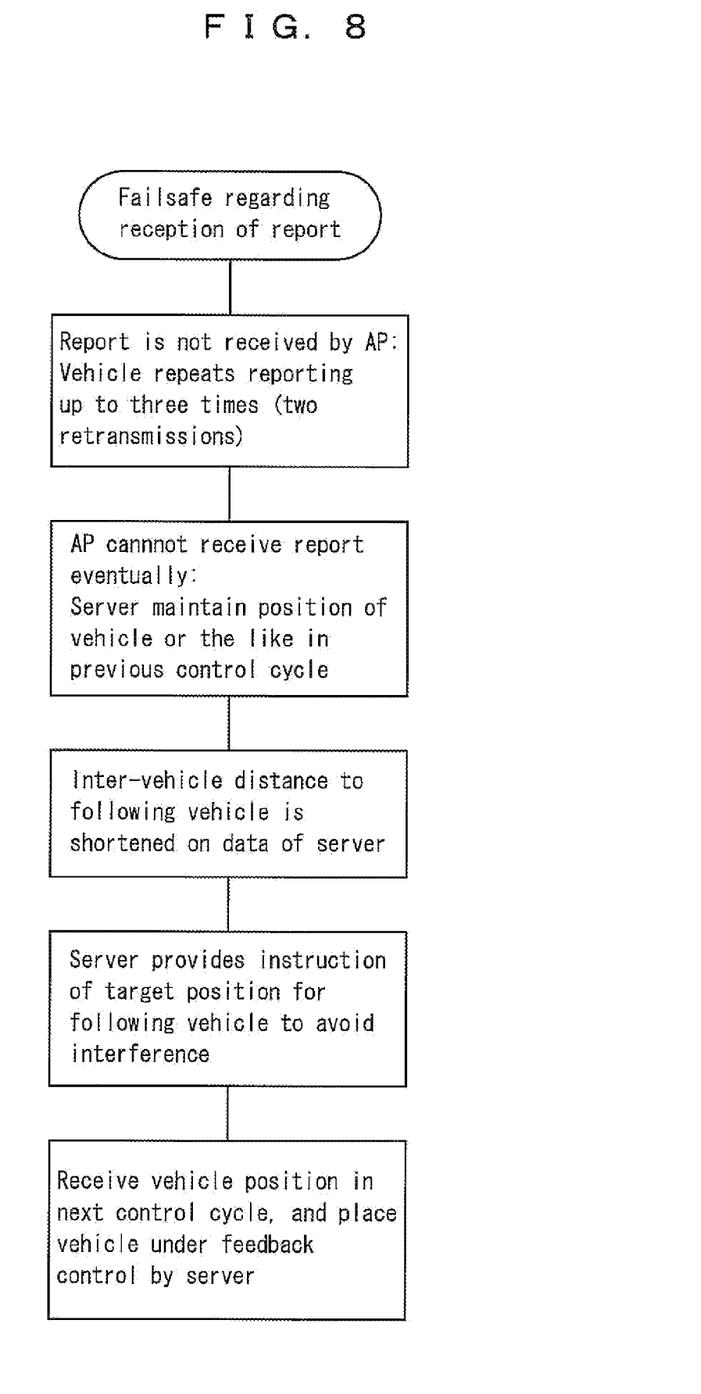
FIG. 8 is a flow chart showing a case where the system server failed to receive a report from the traveling vehicle.
Figure 12:
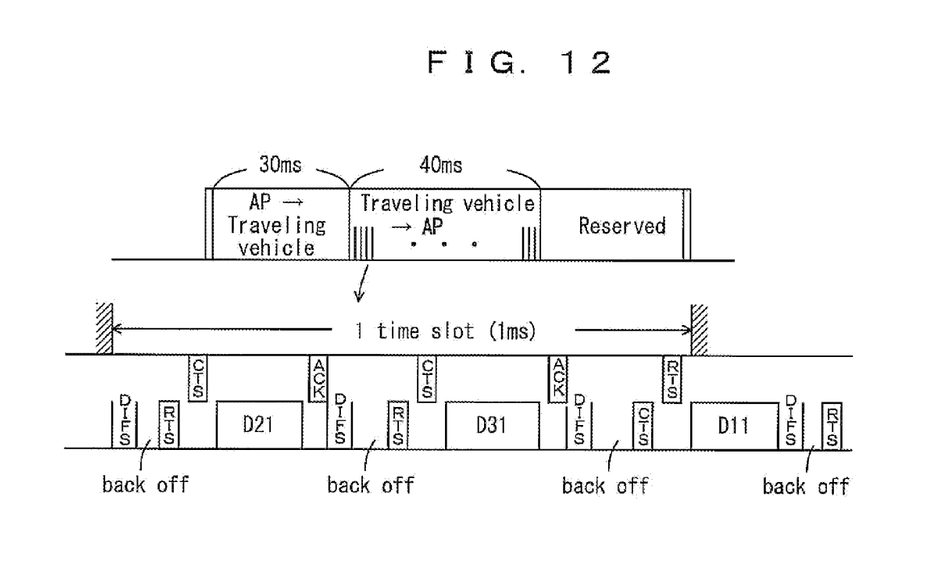
FIG. 12 shows communication from the traveling vehicle to the access point.

FIG. 8 shows a failsafe mechanism in the case where the system server has failed to receive a report from the traveling vehicle. In the case where the access point failed to receive a report, the traveling vehicle retries to transmit the report up to three times including the failed one. If all of the three attempts fail, the server stores data of the states such as the position of the traveling vehicles in the previous control cycle without updating the data. The term "fail" herein means that although an RTS signal (transmission request signal) shown in FIG. 12 is transmitted, it is not possible to receive any acknowledgement signal (ACK) indicating that the transmission has been completed normally. Since the server does not update data of the states of the vehicle in the previous cycle, the inter-vehicle distance with the following traveling vehicle is shortened on the data of the system server, and the server provides an instruction of the target position for the following traveling vehicle to avoid interference. In the next control cycle, if the server receives the position or the like of the vehicle, the vehicle can be placed under feedback control of the server again.

Figure 9:
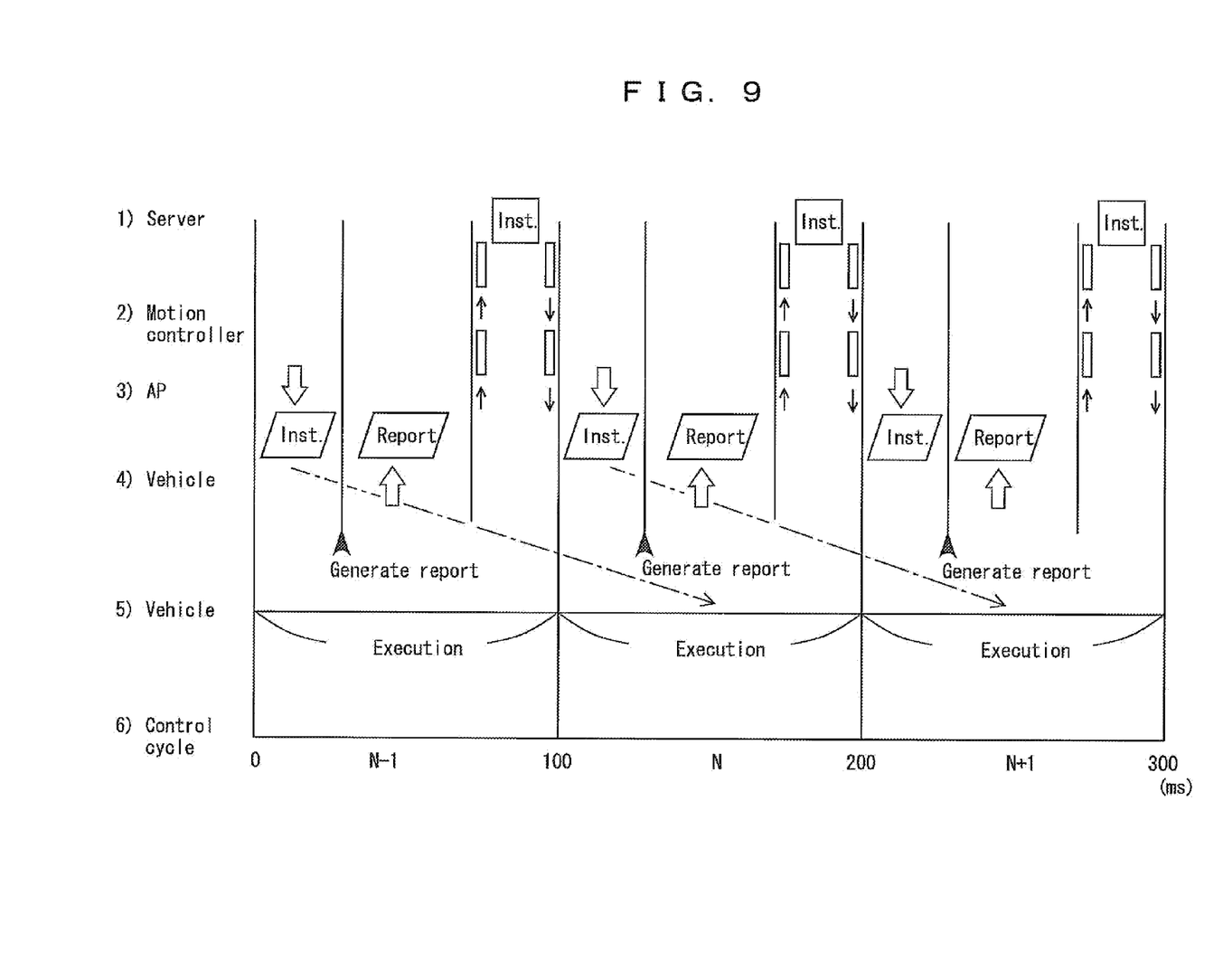
FIG. 9 shows communication timings between the traveling vehicles and the system server, and timings in processing.

FIG. 9 shows timings of reports from the traveling vehicles to the system server and instructions from the system server, and execution of the instructions by the traveling vehicles. The control cycle preferably is about 100 ms, for example, and the time is shown on the lower side of FIG. 9. A plurality of the traveling vehicles generate reports to the system server at a common time point, e.g., about 30 ms after the beginning of the cycle, and report the instructions separately in the period of, e.g., about 30 ms to about 70 ms, for example. In this manner, the system server gets the information of the positions of the traveling vehicles at the common time point. The reports are transmitted from the access points to the system server through the motion controller. The system server generates instructions for the next control cycle (control cycle N in FIG. 9), and sends the instructions through the motion controller to the access points. Transfer of the reports to transmission of instructions to the access points are handled in the period of about 70 ms to about 100 ms, for example. The access points transmit the instructions to the traveling vehicles in the first period of about 30 ms, for example, of the next control cycle. The traveling vehicles execute the instructions in the control cycle N+1. In the remaining period of about 70 ms, for example, of the control cycle N, the main controllers of the traveling vehicles generate control data such as target velocity patterns or the like in the control cycle N+1. In the control cycle N+1, the instructions of target positions for the control cycle N are executed concurrently. Alternatively, the time point when the reporting packet is generated by the traveling vehicle may be regarded as the beginning of the control cycle, and the time point when the next reporting packet is generated may be regarded as the end of the control cycle. In this case, when the instruction is received, the instruction is executed immediately.

Figure 10:
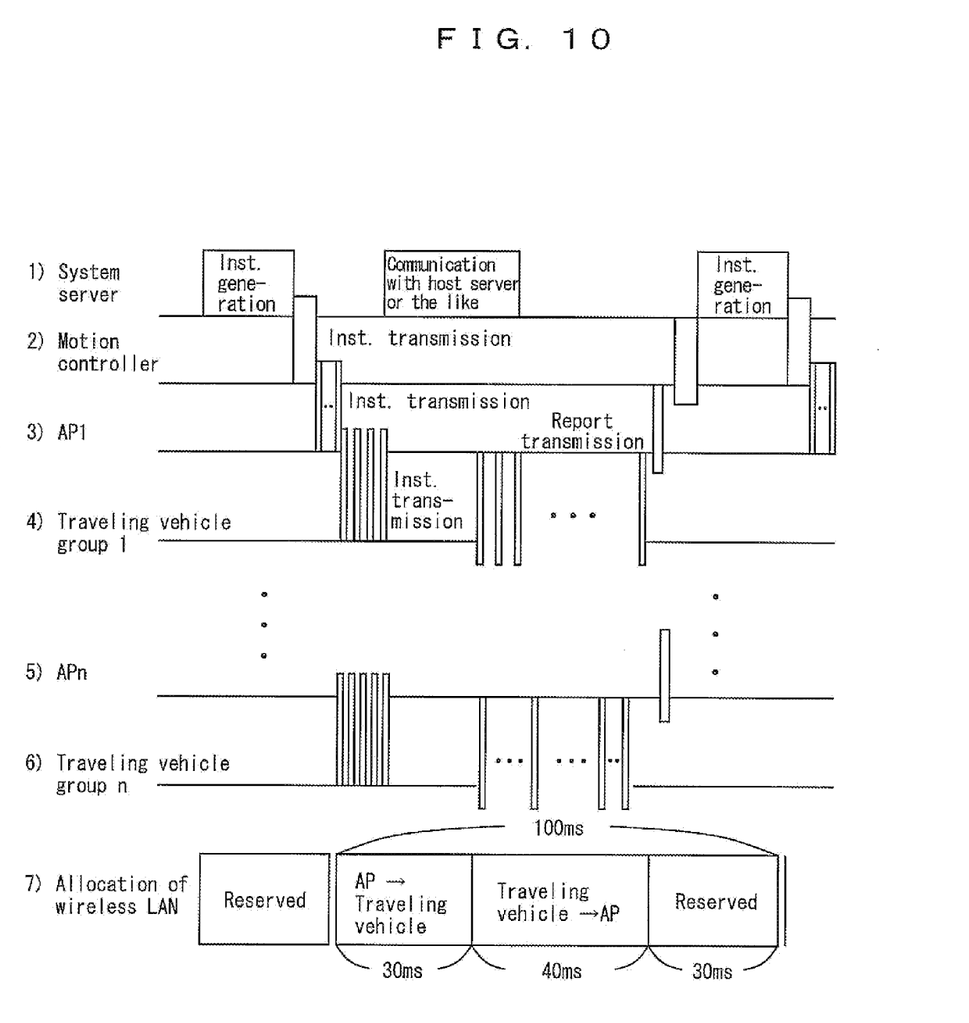
FIG. 10 shows communication timings between the system server and the traveling vehicles, where the item 1) shows processing in the system server, the item 2) shows processing in a motion controller, the items 3) and 5) show processing in the access point, and the items 4) and 6) show processing in a group of traveling vehicles.

FIG. 10 shows timings or the like of communication between the system server and the traveling vehicles. For example, one control cycle preferably is about 100 ms. In the control cycle, a period of about 30 ms is preferably used for data transmission from the access point to the traveling vehicle, the next period of about 40 ms is preferably used for communication from the traveling vehicle to the access point, and the remaining period of about 30 ms is preferably reserved. The access point transmits instructions to about 60 traveling vehicle at a maximum in the first period of about 30 ms, for example, in the cycle, and the traveling vehicles divide the allocated time of about 40 ms into 40 periods, for example, and randomly select an individual allocated time of, e.g., about 1 ms for starting data transmission one by one. In this range of about 1 ms, by the back-off algorithm, collision of transmission packets between the traveling vehicles is prevented.

Figure 11:
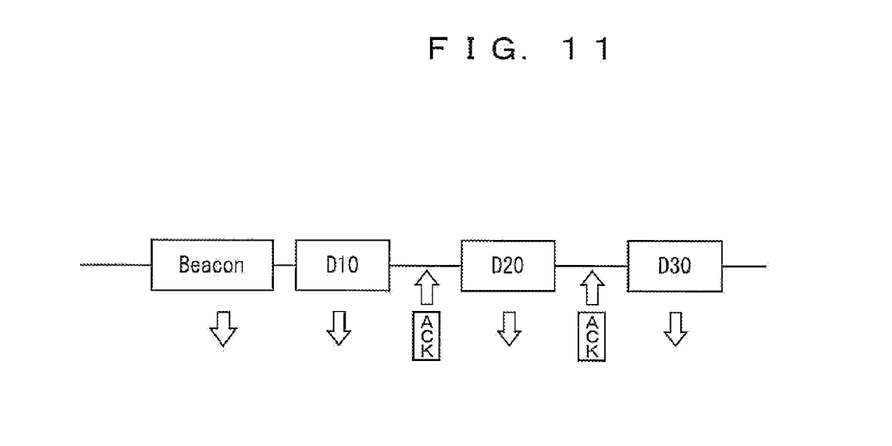
FIG. 11 shows communication from the access point to the traveling vehicle.

FIG. 11 shows an example of data transmission from the access point to the traveling vehicle. Initially, a beacon signal is outputted, and then, data of each traveling vehicle is transmitted. A period of, e.g., about 30 ms after generation of the beacon signal is a period allocated for data transmission from the access point. During this period, control for prevention of packet collisions using RTS (message indicating the start of transmission), CTS (message indicating that reception is ready) or the like is not required. Each time the traveling vehicle receives an instruction, the traveling vehicle outputs ACK (reception acknowledgement message). D10, D20, D30 or the like of FIG. 11 show instructions for respective individual traveling vehicles.

FIG. 12 shows processing in one time slot (about 1 ms) of about 40 ms, for example, allocated for data transmission from the traveling vehicle to the access point. It should be noted that this time slot is referred to as the allocated period. The maximum number of the traveling vehicles per access point preferably is 60, for example. Since the transmission period is divided into 40 slots, the average number of the traveling vehicles per one time slot is about 1.5 of the time slots at the maximum, for example. It is sufficient to consider the case where, at most, about five traveling vehicles use one time slot for communication. For example, on the premise that 1.5 traveling vehicles use one time slot on average, the probability that five traveling vehicles use one time slot is about 1/24 of the probability that one traveling vehicle uses one traveling slot. In the case where a plurality of traveling vehicles transmit data within one time slot, the order of transmissions is restricted using the back-off algorithm. That is, when the time slot comes, each traveling vehicle generates a random number in a range of 0 to 15. If the time without any carrier continues for a period of DIFS (waiting time specified by IEEE 802.11) and the back-off period, an RTS signal is outputted. Assuming that one of 16 random numbers can be used in the back-off algorithm, the probability that the two traveling vehicles have the same back-off period is very small. If CTS can be received from the access point in response to the RTS, data transmission is started. When the access point receives the data, the access point outputs an acknowledgement signal ACK.

Figure 13:
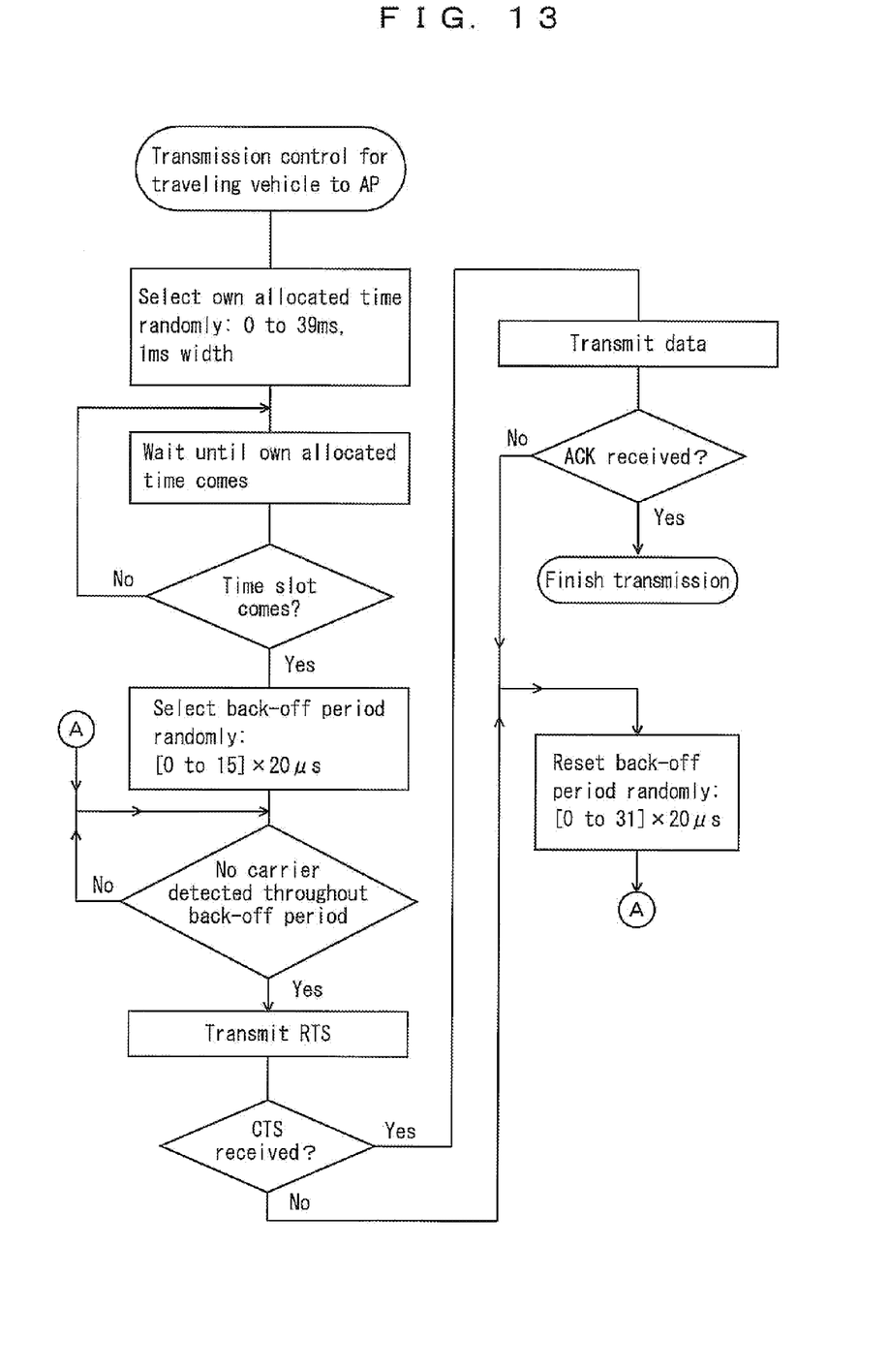
FIG. 13 is a flow chart showing a data transmission algorithm from the traveling vehicle to the access point.

FIG. 13 shows control of data transmission from the traveling vehicle to the access point. The period of time allocated for data transmission preferably is about 40 ms, for example. The traveling vehicle selects time allocated to itself randomly by units of about 1 ms, for example. The traveling vehicle waits until its allocated time comes. When the allocated time (period) comes, the traveling vehicle randomly selects the back-off period. If no carrier is detected during the back-off period, the RTS is transmitted. The detection of the carrier indicates the presence of communication between the access point and another traveling vehicle. When the CTS is received, the traveling vehicle transmits data. Thereafter, when the traveling vehicle successfully receives the ACK, the traveling vehicle finishes data transmission. In the case where no ACK is received after transmission of the RTS, the back-off period is randomly set again, and transmission is retried. In the absence of any collision between packets, the period from DIFS to ACK is, e.g., about 400 μs for reporting of one traveling vehicle. Therefore, if three or more traveling vehicles use one time slot, data transmission may not be finished in the period of about 1 ms, for example. In this case, the traveling vehicle that has not finished data transmission continues the transmission process by transmitting the RTS on condition that no carrier is detected during the back-off period also in the next time slot. The condition indicates no communication between the access point and another traveling vehicle is heard. In the meanwhile, the traveling vehicle scheduled to use the next time slot waits for data transmission using the back-off algorithm. If the traveling vehicles failed to transmit the data, it is arbitrarily determined whether the data transmission is permitted until the next slot or not.

Figure 14:
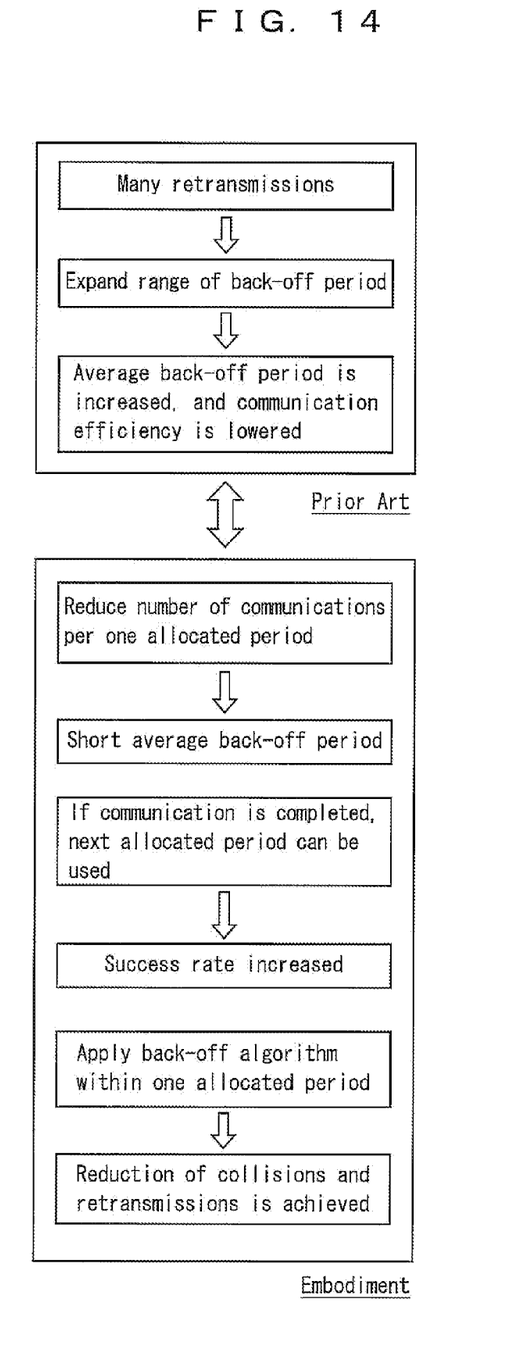
FIG. 14 is a diagram showing a mechanism arranged to prevent congestion of data transmission from the vehicles.

FIG. 14 shows comparison between the data transmission algorithm according to the present preferred embodiment and a simple back-off algorithm. It is assumed that 60 traveling vehicles are present per one access point, for example. In the normal back-off algorithm, the waiting time until data transmission includes 16 segments of 0 to 15. If 60 traveling vehicles are accommodated in 16 segments, most of transmission packets collide with each other, and the number of retransmission is increased. If the range of the back-off period is widened for decreasing the number of retransmissions, the average back-off period is increased, and the communication efficiency is decreased.

In contrast, in the present preferred embodiment, since the period of about 40 ms, for example, is divided into periods in the units of 1 ms, the average number of transmissions per one allocated period is about 1.5, for example. Since it is sufficient to control 1.5 transmissions without any collisions, the back-off period can be shortened. Further, even if communication is not completed in the allocated period of about 1 ms, communication can continue using the next allocated period. As a result, the success rate of communication is increased. Since collisions between transmissions within one allocated period can be avoided by the back-off algorithm, collisions and the resulting retransmissions can be reduced.

While preferred embodiments of the present invention have been described above, it is to be understood that variations and modifications will be apparent to those skilled in the art without departing the scope and spirit of the present invention. The scope of the present invention, therefore, is to be determined solely by the following claims.

DESCRIPTION OF THE NUMERALS

2: traveling vehicle system
4: inter-bay route
6: intra-bay route
8: access point
10: area
12: traveling vehicle
14: ground LAN
16: motion controller
18: system server
20: host server
22: clock
24: vehicle state memory
26: instruction generator
28: antenna
30: communication unit
32: main controller
34: travel system
35: transfer system
36: sensor group
40: radio wave strength detector
41: roaming unit
42: transmission controller
43: clock
44: clock calibrator
fa to fd: channel

What is claimed is:
1. A traveling vehicle system comprising:
a system server;
a plurality of access points connected to the system server through a LAN; and a plurality of traveling vehicles arranged to communicate with the plurality of access points in each control cycle through wireless communication; wherein each control cycle includes an instruction time zone to provide instructions from the plurality of access points to the plurality of traveling vehicles, and a report time zone to provide reports from the plurality of traveling vehicles to the plurality of access points;

the instruction time zone and the report time zone are separate periods of time;

the plurality of access points include an instructing unit arranged to transmit a target position to the plurality of traveling vehicle in the instruction time zone;

the plurality of traveling vehicles include a reporting unit to report a position to the plurality of access points in the report time zone; and the system server includes an instruction generator to determine the target positions of the plurality of traveling vehicles based on the position reported to the plurality of access points, the system server being configured to transmit the determined target positions to the plurality of access points.

2. The traveling vehicle system according to claim 1, wherein each of the system server and the plurality of traveling vehicles includes a clock, time data of the clock of the system server is transmitted from the plurality of access points to the plurality of traveling vehicles together with the target positions, and the clock of the plurality of traveling vehicles is calibrated for synchronization with the transmitted time data.

3. The traveling vehicle system according to claim 1, wherein the report time zone is divided into a plurality of time slots, the plurality of traveling vehicles include a selector arranged to randomly select one of the plurality of time slots to transmit the report to the plurality of access points in the selected time slot.

4. The traveling vehicle system according to claim 1, wherein the plurality of access points are arranged to transmit the target positions to the plurality of traveling vehicles in each control cycle and report the positions reported from the plurality of traveling vehicles to the system server in each control cycle;

the plurality of traveling vehicles are configured to report the positions to the plurality of access points in each control cycle; and the system server is configured to transmit the target positions to the plurality of access points in each control cycle.

5. The traveling vehicle system according to claim 4, wherein the plurality of traveling vehicles are configured to create reports concurrently when a same period of time has elapsed from a beginning of the control cycle, and transmit the reports in a dispersed manner in the report time zone by the reporting units.

6. The traveling vehicle system according to claim 5, wherein the plurality of access points are configured to transmit target positions in a current control cycle to the plurality of traveling vehicles based on the reports of the positions from the plurality of traveling vehicles in a previous control cycle; and the plurality of traveling vehicles are configured to execute an instruction of the target position in the current control cycle, in a next control cycle.

7. The traveling vehicle system according to claim 3, wherein when the selected time slot comes, if communication between another traveling vehicle and the plurality of access points has not been monitored throughout a randomly selected back-off period, the plurality of traveling vehicles are configured to start data transmission to the plurality of access points;

if the plurality of traveling vehicles started data transmission to the plurality of access points, and failed to complete data transmission to the plurality of access points normally, the plurality of traveling vehicles are configured to reset the back-off period; and if the plurality of traveling vehicles failed to complete data transmission to the plurality of access points within the selected time slot, and communication between the another traveling vehicle and the plurality of access points has not been monitored throughout the back-off period in a next time slot, the plurality of traveling vehicles are configured to start data transmission to the plurality of access points.

8. The traveling vehicle system according to claim 4, wherein if the plurality of access points failed to transmit the target positions to the plurality of traveling vehicles, the plurality of access points are configured to retransmit the target positions a first predetermined number of times, and if the plurality of access points failed to retransmit the target positions, the plurality of traveling vehicles are configured to travel in accordance with the target positions received in a previous control cycle; and if the plurality of traveling vehicles failed to transmit the positions to the plurality of access points, the plurality of traveling vehicles are configured to retransmits the positions a second predetermined number of times, and if the plurality of traveling vehicles failed to transmit the positions, the system server is configured to determine target positions of the plurality of traveling vehicles based on positions received in the previous control cycle, without updating the positions of the plurality of traveling vehicles having the failure in retransmission.

9. A method of communication between a system server and a plurality of traveling vehicles by wireless communication in each control cycle in a traveling vehicle system, the method including the steps of:

connecting the system server and a plurality of access points through a LAN;

transmitting target positions from the plurality of access points to the plurality of the traveling vehicles in an instruction time zone within the control cycle;

reporting positions from the plurality of traveling vehicles to the plurality of access points in a report time zone within the control cycle;

determining the target positions of the plurality of traveling vehicles via the system server based on the positions reported to the plurality of access points; and transmitting via the system server the target positions to the plurality of access points between the report time zone and the instruction time zone; wherein the instruction time zone and the report time zone are separate periods of time.

* * * * *